(12) United States Patent
Glista (10) Patent No.: US 9,908,477 B1
(45) Date of Patent: Mar. 6, 2018

(54) CART MOUNT FOR CLUB AND BALL WASHER

(71) Applicant: Stanley Richard Glista, Beloit, OH (US)

(72) Inventor: Stanley Richard Glista, Beloit, OH (US)

( * ) Notice: Subject to any disclaimer, the term of this patent is extended or adjusted under 35 U.S.C. 154(b) by 0 days.

(21) Appl. No.: 15/442,847

(22) Filed: Feb. 27, 2017

Related U.S. Application Data (60) Provisional application No. 62/327,882, filed on Apr. 26, 2016.

(51) Int. Cl.
| | | |
|---|---|---|
| A63B 47/04 | (2006.01) |
| A63B 57/00 | (2015.01) |
| B60R 9/06 | (2006.01) |
| B60R 9/08 | (2006.01) |
| B60R 11/00 | (2006.01) |
| B60R 15/02 | (2006.01) |
| A63B 57/60 | (2015.01) |

(52) U.S. Cl.
CPC .............. *B60R 9/08* (2013.01); *B60R 9/06* (2013.01); *B60R 11/00* (2013.01); *B60R 15/02* (2013.01); *A63B 47/04* (2013.01); *A63B 57/60* (2015.10); *B60R 2011/004* (2013.01); *B60R 2011/005* (2013.01); *B60Y 2200/23* (2013.01)

(58) Field of Classification Search
CPC ........... A63B 47/04; A63B 57/60; B60R 9/06; B60R 9/08; B60R 2011/0059; B60R 11/00
USPC ............................ 224/274, 512, 514; D12/16
See application file for complete search history.

(56) References Cited

U.S. PATENT DOCUMENTS

| | | | | |
|---|---|---|---|---|
| 1,640,779 | A * | 8/1927 | Laher ........................ | B60R 9/06 224/500 |
| 3,140,498 | A * | 7/1964 | Drescher ................. | A63B 47/04 15/21.2 |
| 4,006,852 | A * | 2/1977 | Pilsner .................... | B60R 11/00 224/401 |
| 4,163,299 | A * | 8/1979 | Duda ..................... | A63B 47/04 15/21.2 |
| 4,381,574 | A * | 5/1983 | Benkovsky ............ | A63B 47/04 15/21.2 |
| 4,734,952 | A * | 4/1988 | Parchment ............. | A63B 57/60 15/104.92 |
| 5,088,635 | A * | 2/1992 | Taylor .................... | B62J 11/00 224/274 |
| 6,425,562 | B1 * | 7/2002 | Knudson .............. | F16M 13/022 248/220.21 |
| 6,579,189 | B2 * | 6/2003 | Anzaldua ........... | A63B 69/0079 473/139 |

(Continued)

*Primary Examiner* — Justin Larson
(74) *Attorney, Agent, or Firm* — Zollinger & Burleson Ltd.

(57) ABSTRACT

A mount can be used readily with a rented golf cart to mount a washing device to the rear of the golf cart. The washing device can include a club head washer, a ball washer, or both. The mount does not require special fasteners and can be used with a wide variety of golf carts that hold golf bags on a rack at the rear of the cart. The mount fits in the golf bag rack where the golf bags are carried by the cart. The feet of the mount are placed into the rack before the golf bag or bags are added. The golf bag or golf bags hold the mount in place. The weight of a typical golf bag or a pair of golf bags is sufficient to hold the mount in the mounted configuration. The mounting method is quick and requires no separate fasteners.

6 Claims, 13 Drawing Sheets

(56) References Cited

U.S. PATENT DOCUMENTS

| | | | |
|---|---|---|---|
| 6,662,396 B1* | 12/2003 | Scarpelli, Sr. | A63B 47/04 15/160 |
| 6,745,424 B1* | 6/2004 | Pimentel | A63B 47/04 15/104.92 |
| 8,458,847 B2* | 6/2013 | Herrmann | A43B 3/163 15/160 |
| 8,662,363 B2* | 3/2014 | Williams | A63B 47/04 14/21 |
| 2002/0145095 A1* | 10/2002 | Winkler | A63B 57/00 248/300 |
| 2010/0133308 A1* | 6/2010 | Hardy | B60R 11/00 224/274 |

* cited by examiner

CART MOUNT FOR CLUB AND BALL WASHER

CROSS-REFERENCE TO RELATED APPLICATION

This application claims the benefit of U.S. Provisional Patent Application Ser. No. 62/327,882 filed Apr. 26, 2016; the disclosures of which are incorporated herein by reference.

BACKGROUND OF THE DISCLOSURE

1. Technical Field

The disclosure generally relates to golf equipment and, more particularly, to a mount that allows a washing device such as a club and ball washer to be readily mounted and removed from a golf cart. Specifically, the disclosure relates to a mount that is personal to the user of a golf cart such that the user can readily mount a club and ball washer to a rented golf cart while the user is playing the course.

2. Background Information

Golfers often need to clean their club heads and golf balls during a round which can last about two hours for a nine hole round or four hours for an eighteen hole round. Most golfers use a wet towel for club and ball cleaning. Although generally useful, towels often dry out during the round leaving the golfer with no easy way to clean a muddy club face or a dirty golf ball. Although some courses supply clean water that can be used to wet a towel after it has dried, other courses do not supply water frequently enough and in dry, warm weather the towel can rapidly dry. A golf also can wet a towel in a water hazard, but this can lead to a towel with an unpleasant smell after it is stored in the golfer's vehicle for a few days.

Some golf carts are provided with a ball washers and some of these washers include a club head washer with bristles for removing dirt from the club head grooves. Unfortunately, these devices are not always provided with golf carts. When they are provided, the washers can be mounted in locations that are inconvenient for one or both of the passenger or driver or mounted in a location that can splash dirty water from the device onto the golfers or onto the golf bags.

SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The disclosure provides a mount that can be used readily with a rented golf cart to mount a washing device to the rear of the golf cart. The mount does not require special fasteners and can be used with a wide variety of golf carts that hold golf bags on a rack at the rear of the cart. The disclosure also provides the combination of a golf cart with the mount secured by at least one golf bag. A method of installing, using, and removing the mount is also described.

The mount can be used with a wide variety of washing devices. An exemplary washing device is a container of water with an open top that allows the golfer to insert the head of the golf club into the water. The device can include bristles that allow the golfer to clean the grooves of the club face. Other club head washing devices can be used with the mount. Such club head washers can be a wet cloth or sponge combined with a supply of water or liquid cleaning agent. Another exemplary washing device includes a club head washer combined with a ball washer.

The mount configuration provided in the drawings fits most carts used in the United States that include rear-mounted golf bag racks. The mount includes at least one mounting foot that is used to secure the mount to the cart by placing a golf bag on the mounting foot. In the exemplary configuration, a pair of spaced feet are used and are sized and configured to fit a variety of golf carts. The pair of feet allow the mount to be secured with a pair of golf bags.

The mount fits in the golf bag rack where the golf bags are carried by the cart. The feet of the mount are placed into the rack before the golf bag or bags are added. The golf bag or bags hold the mount in place. The weight of a typical golf bag or a pair of golf bags is sufficient to hold the mount in the mounted configuration. The mounting method is quick and requires no separate fasteners.

A washing device such as a ball washer and/or club head washer is carried by an arm of the mount. These washers are provided as combined units that have ball washer apparatus and club washer apparatus in fluid communication with water held in a container. The user adds water to the washer device which holds enough water to last a typical 18 hole round of golf for two golfers. When the user needs to clean a club, the washer is disposed behind the cart where it is usable just before the player puts his club back in the golf bag. The location is convenient and prevents dirty water from splashing on the golfer, the cart, or the golf bags.

The device is be lifted away from the cart after the bags are removed. The user can then empty the water and store the mount in his vehicle.

BRIEF DESCRIPTION OF THE DRAWINGS

Similar numbers refer to similar elements through the specification.

DETAILED DESCRIPTION OF THE DISCLOSURE

Figure 6:
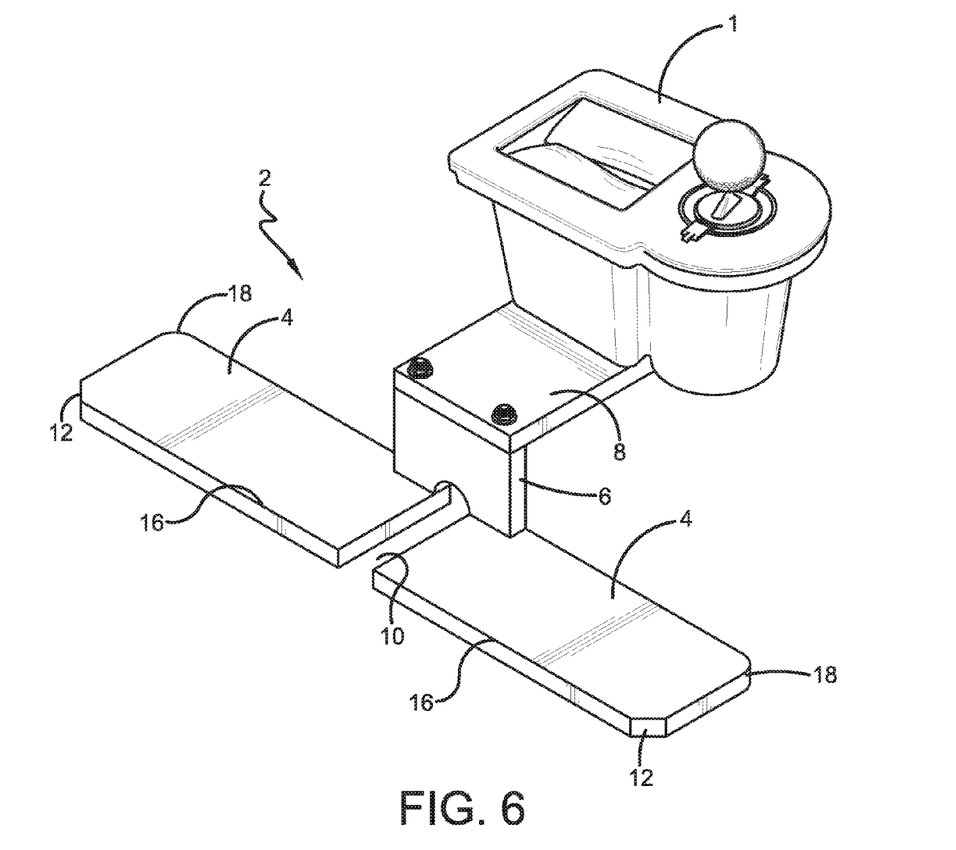
FIG. 6 is a perspective view showing an exemplary washing device carried by the end of the arm of the second configuration of the mount.
Figure 7:
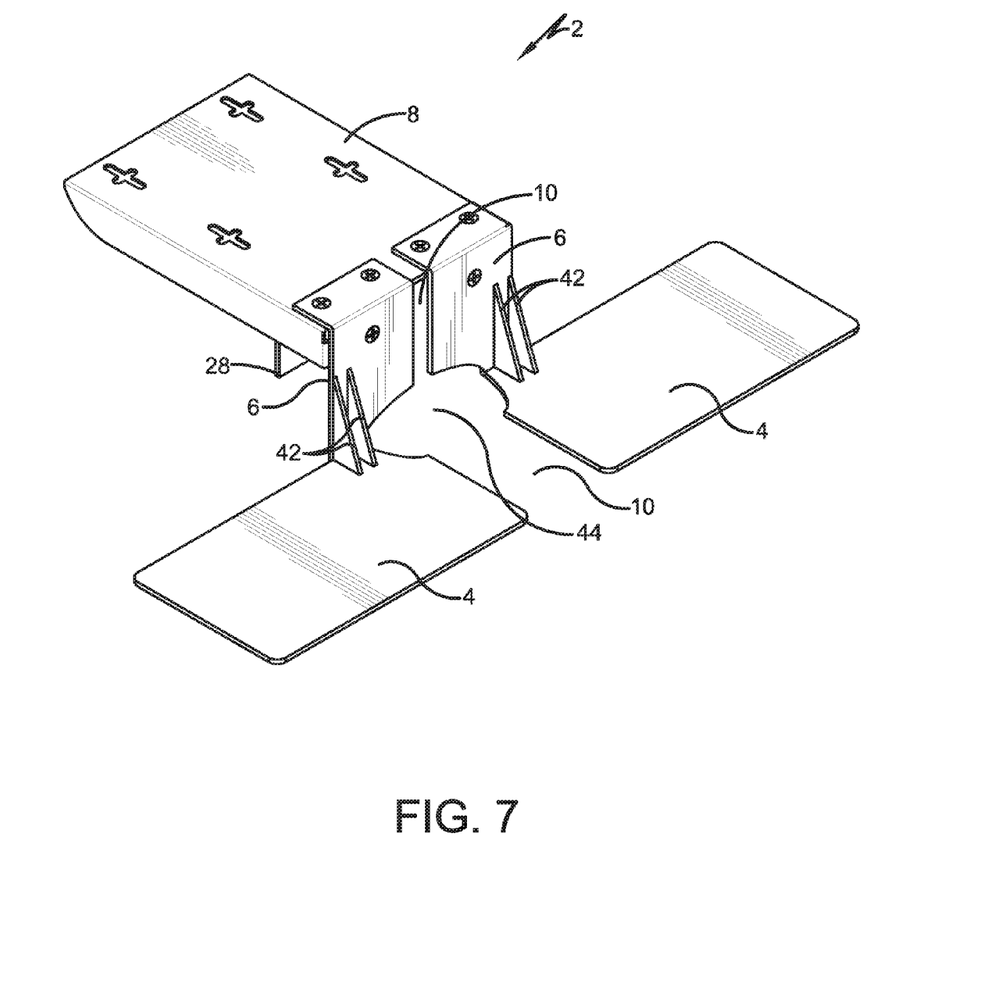
FIG. 7 is a perspective view of a third configuration of the mount.
Figure 8:
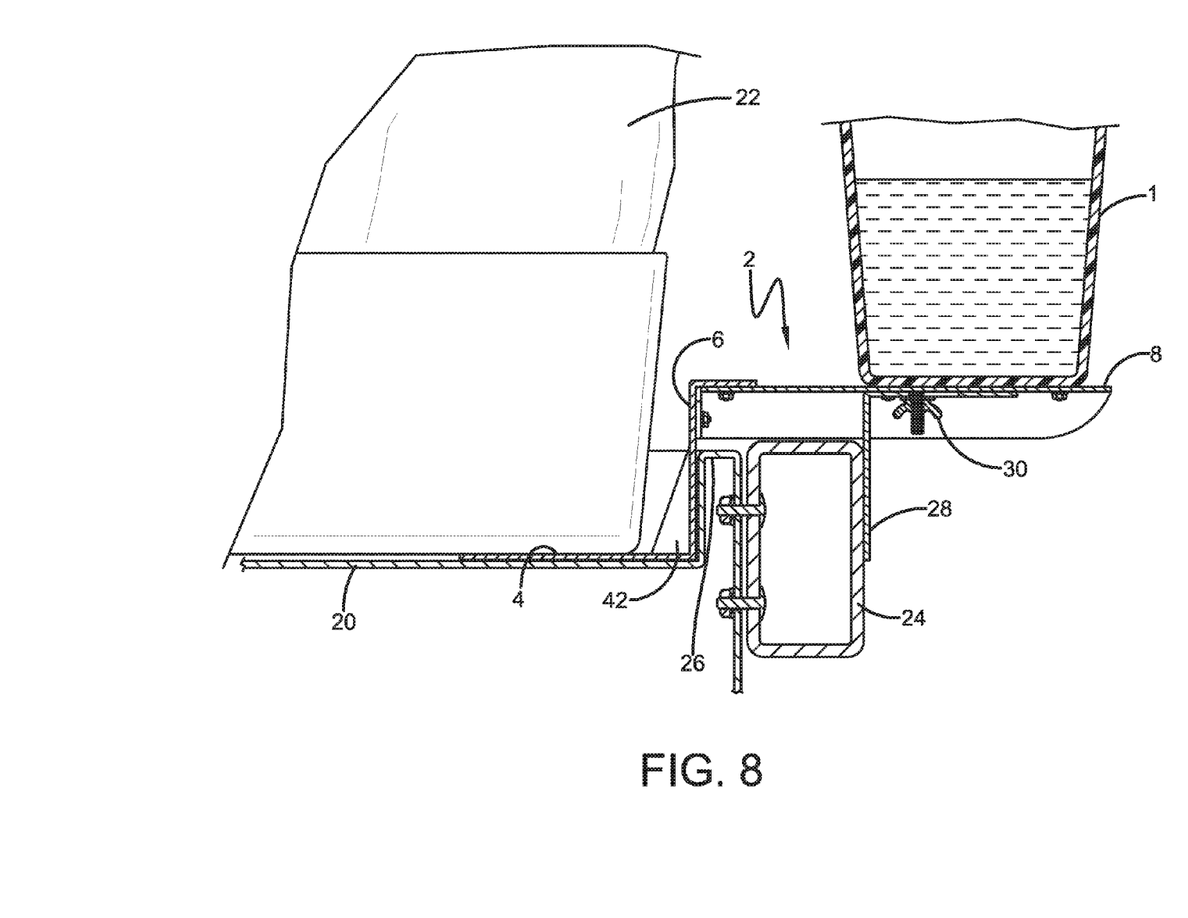
FIG. 8 is a side view, partially in section, showing the third configuration of the mount secured to a golf cart by a golf bag.
Figure 9:
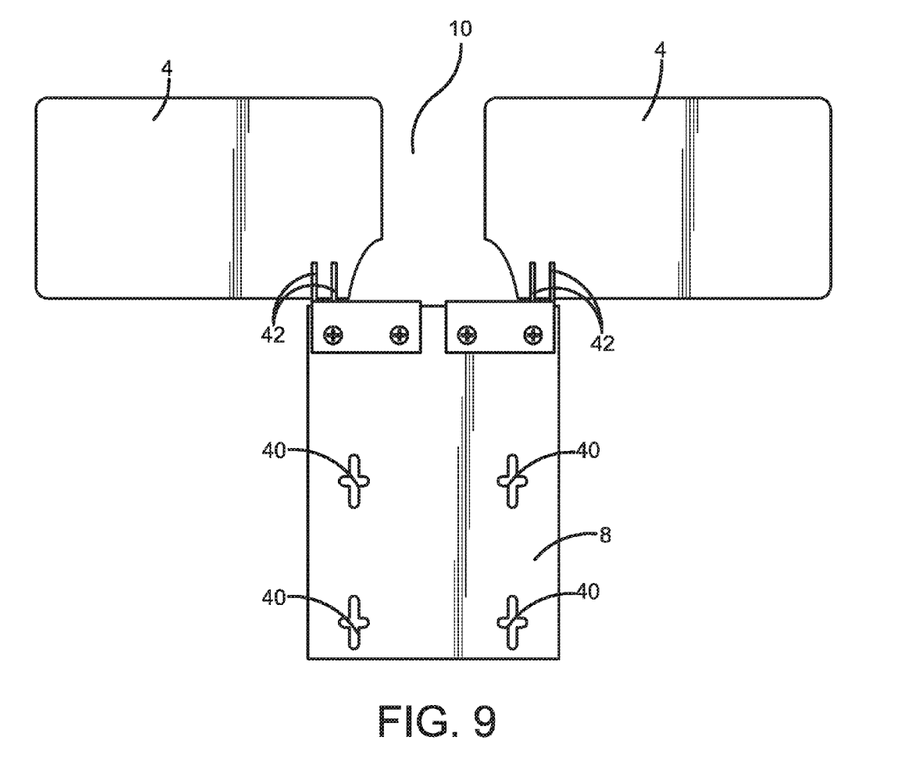
FIG. 9 is a top plan view of the third configuration of the mount.
Figure 10:
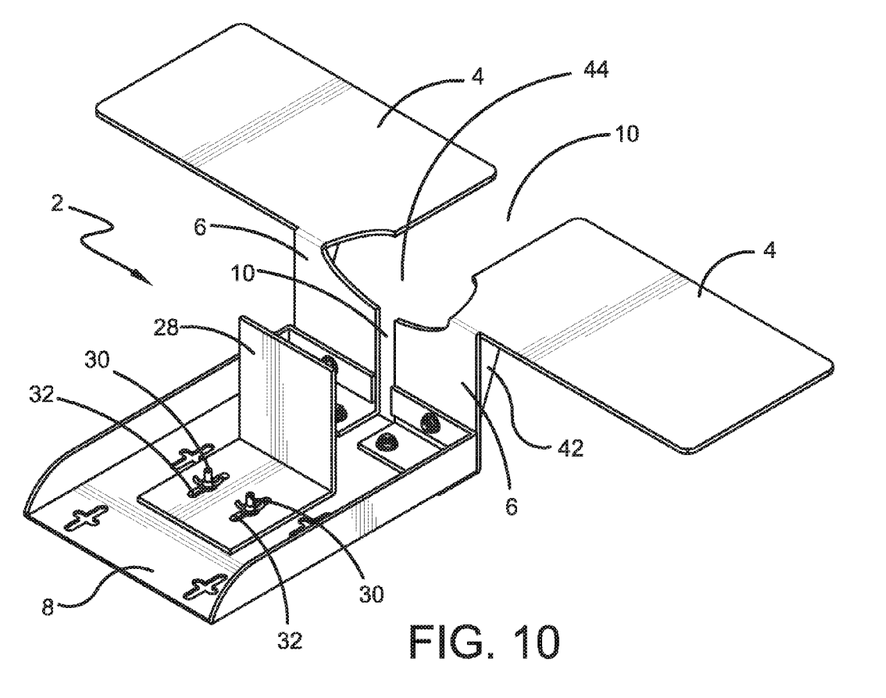
FIG. 10 is a bottom perspective view of the third configuration of the mount.
Figure 11:
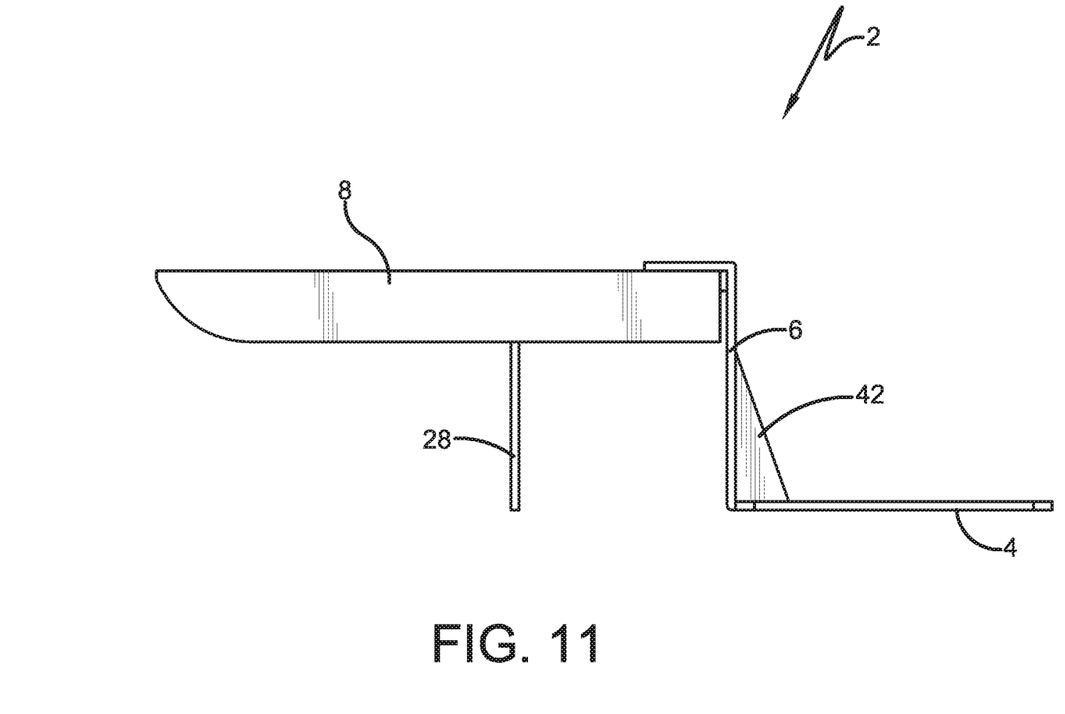
FIG. 11 is a side view of the third configuration of the mount.
Figure 12:
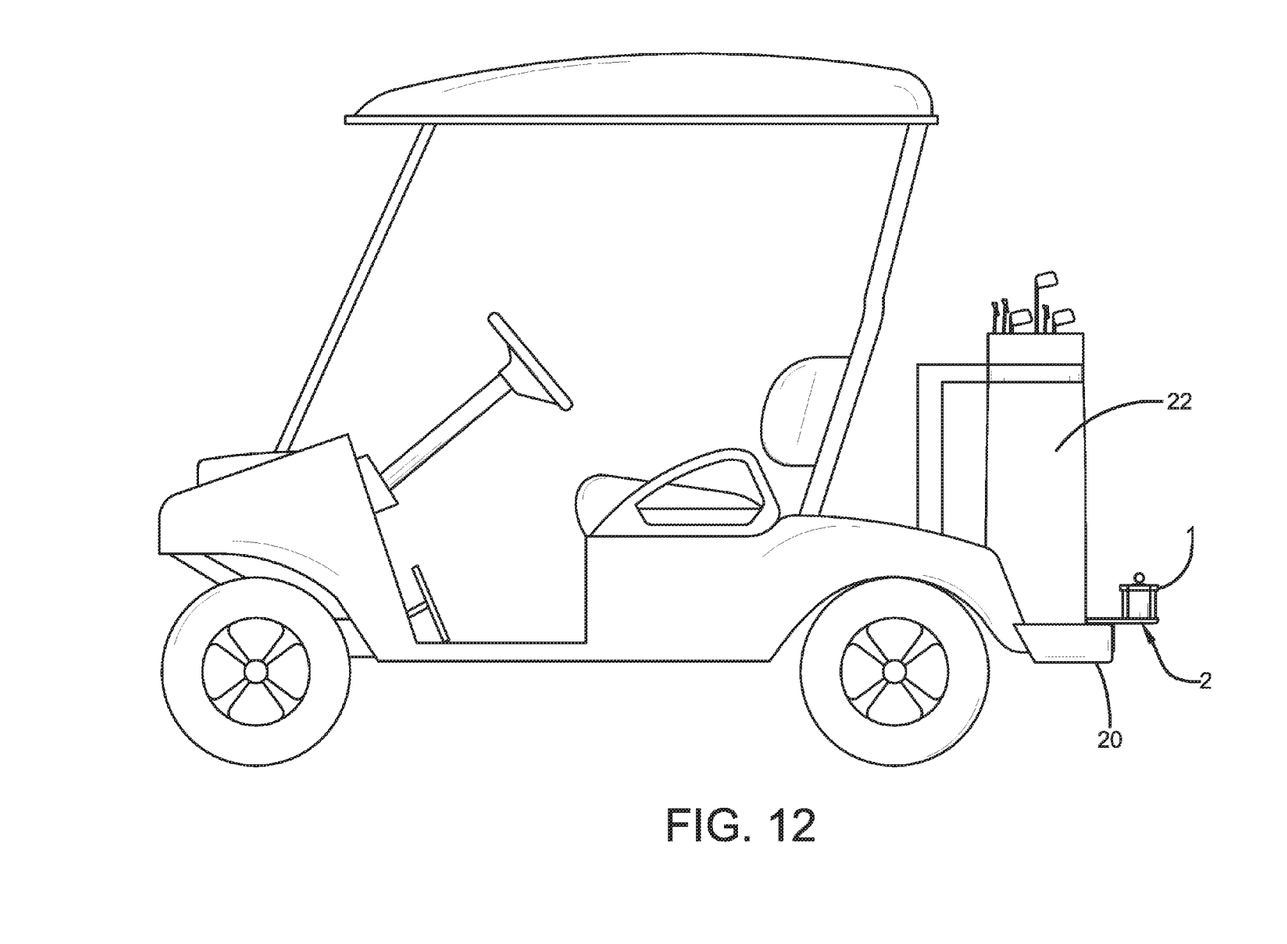
FIG. 12 is a side view of a golf cart with the mount installed.
Figure 13:
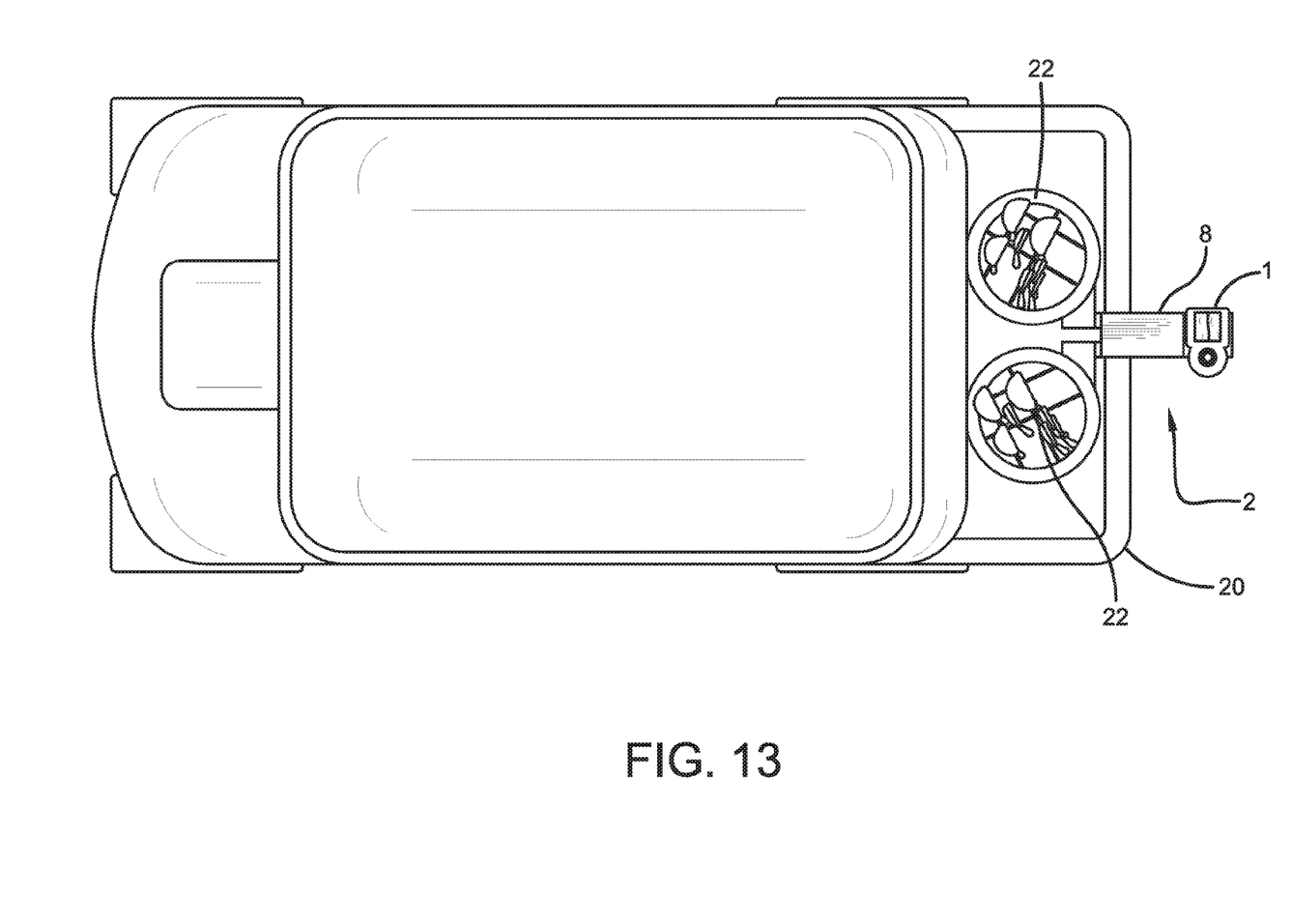
FIG. 13 is a top view of the golf cart and mount shown in FIG. 12.

Exemplary configurations of the washing device mount for golf carts is indicated generally by the reference numeral 2 in the drawings. Mount 2 allows a washing device 1, such as the club and ball washer depicted in FIG. 6, to be readily mounted to a golf cart, used during a round of golf, and removed and stored in the user's vehicle. The washing device can be any of a variety of devices used to clean golf club heads, golf club faces, and golf balls. The washing device often holds a supply of water or cleaning liquid and can include a device that engages the golf club head to frictionally clean the head. The device can be a plurality of bristles or a cloth. A cover can be used to minimize spilling and the cover can include a slit that allows the golf club to be inserted into and removed from the washing device without the need to remove and replace the cover. The washing device can be mounted in the configuration shown in FIG. 6 or can be turned 90 or 180 degrees. Other angled mounting configurations can be provided. In an alternative configuration, mount 2 is configured to receive a plurality of ball and club washers, just a ball washer, or just a club washer as desired by the user.

Mount 2 generally includes at least one mounting foot 4 but typically includes a pair of spaced mounting feet 4, a neck 6, and an arm 8. Neck 6 can be an integral portion of arm 8. Feet 4 are both connected to the lower end of neck 6 and are spaced apart by a slot 10. Each foot 4 is configured to sit in the bottom of a golf bag rack 20 that is typically connected or integrated into the rear of a golf cart. In the exemplary configurations, each foot 4 is 9.25 inches long and 5.4375 inches wide and 0.5 inches thick. The two outer rear corners 12 can be removed at angles to provide an end wall 14 having a dimension of 4.5 inches and a rear wall 16 dimension of 8.50 inches. The two outer front corners 18 are rounded at a 0.75 inch radius. Feet 4 having these configurations have been found to fit in a variety of golf carts at the areas of the cart bag racks 20 that receive the lower ends of golf bags 22. Slot 10 is 1.50 inches wide and is provided to receive a rib that is typically disposed at the center of the bottom wall of rack 20. Slot 10 allows both feet 4 to engage the bottom of the bag receiving area without tipping back and forth during use. This also helps keep the ball and club head washer 1 level. Feet 4 having other dimensions can be used without departing from the concepts of the disclosure. Instead of the broad generally rectangular-shaped feet of the exemplary configuration, feet 4 can be bars or flat rods that are configured to extend under golf bags 22. As noted above, a single foot 4 or a pair of feet can be used.

Figure 1:
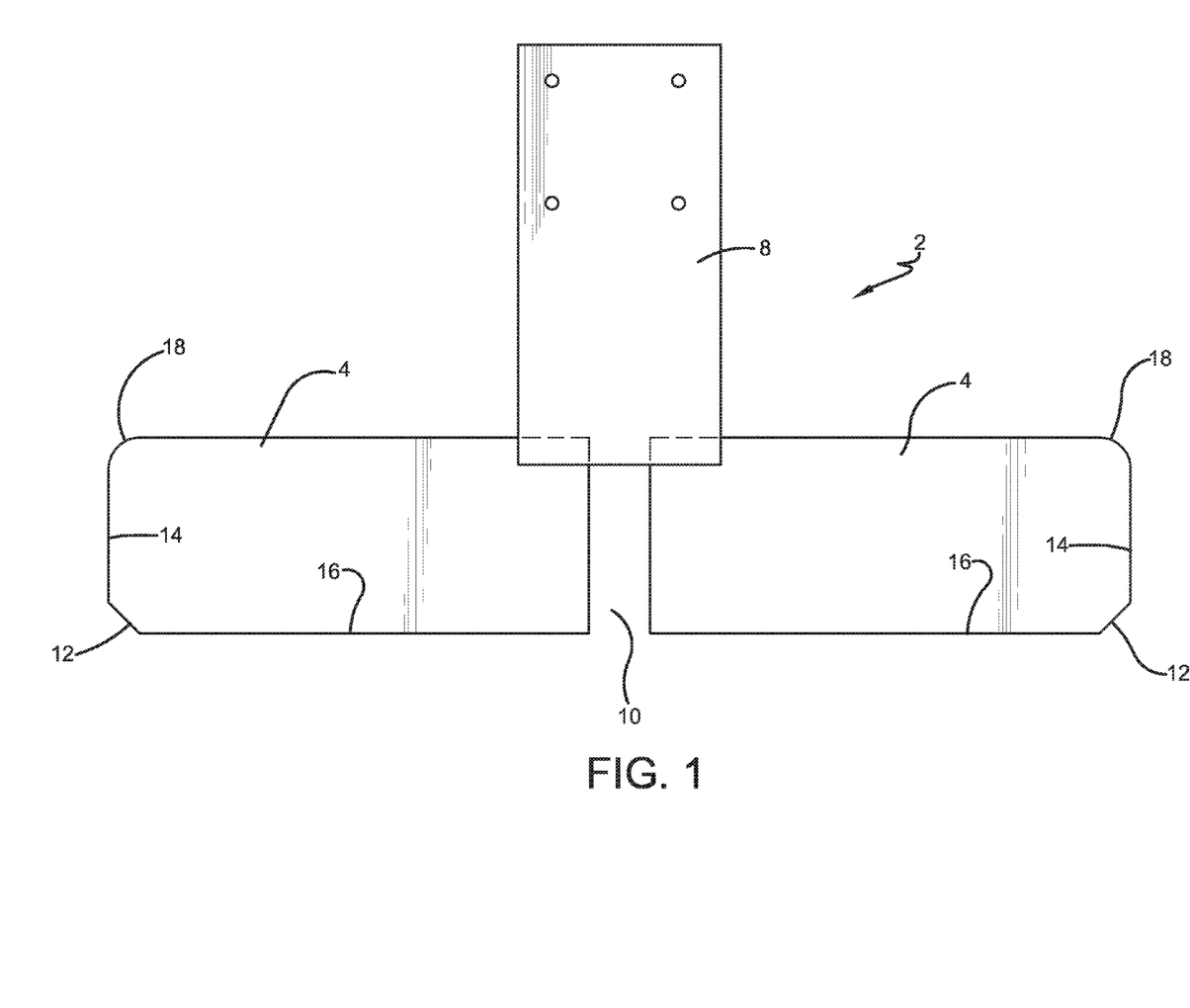
FIG. 1 is a top plan view of a first configuration of the mount.
Figure 2:
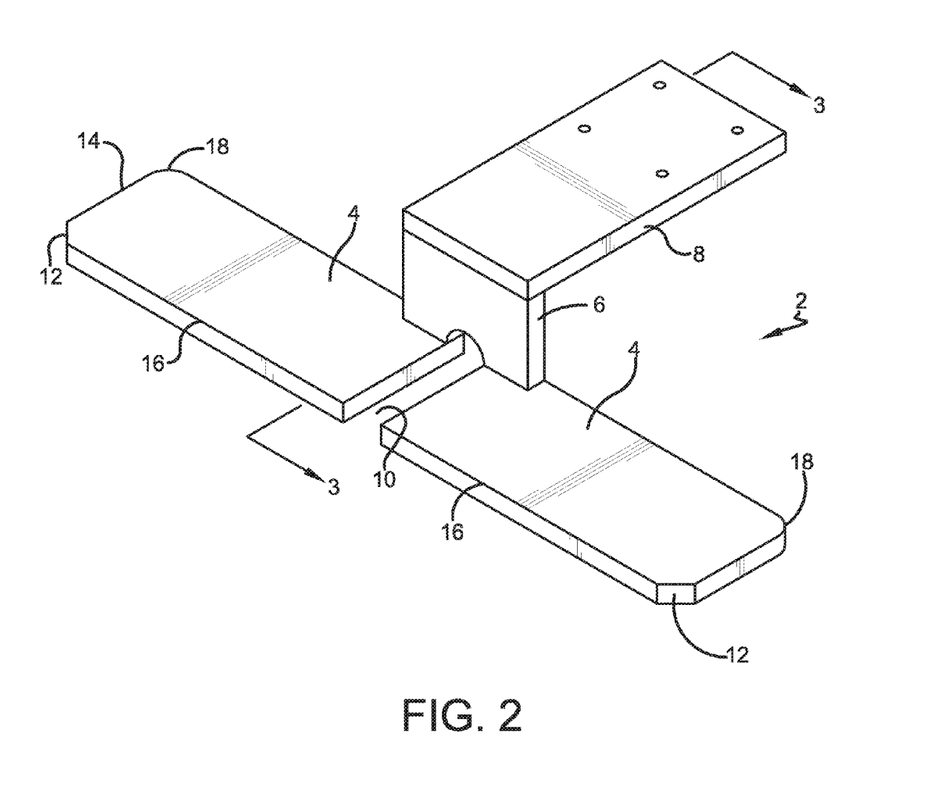
FIG. 2 is a perspective view of the first configuration of the mount.
Figure 3:
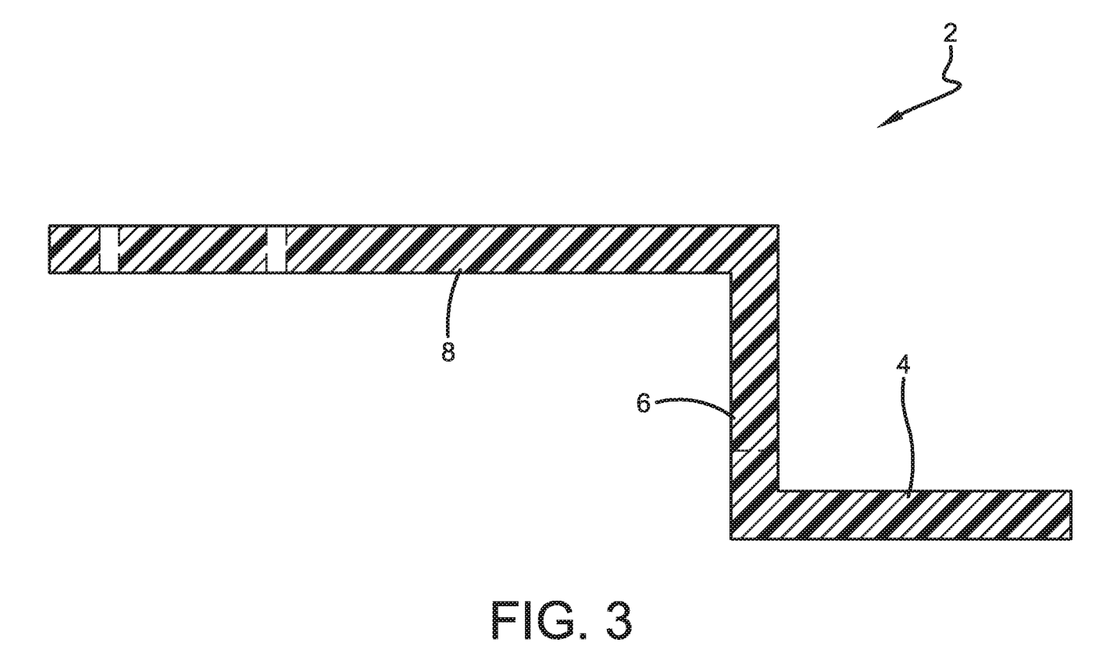
FIG. 3 is a side section view of the first configuration of the mount taken along line 3-3 of FIG. 2.
Figure 4:
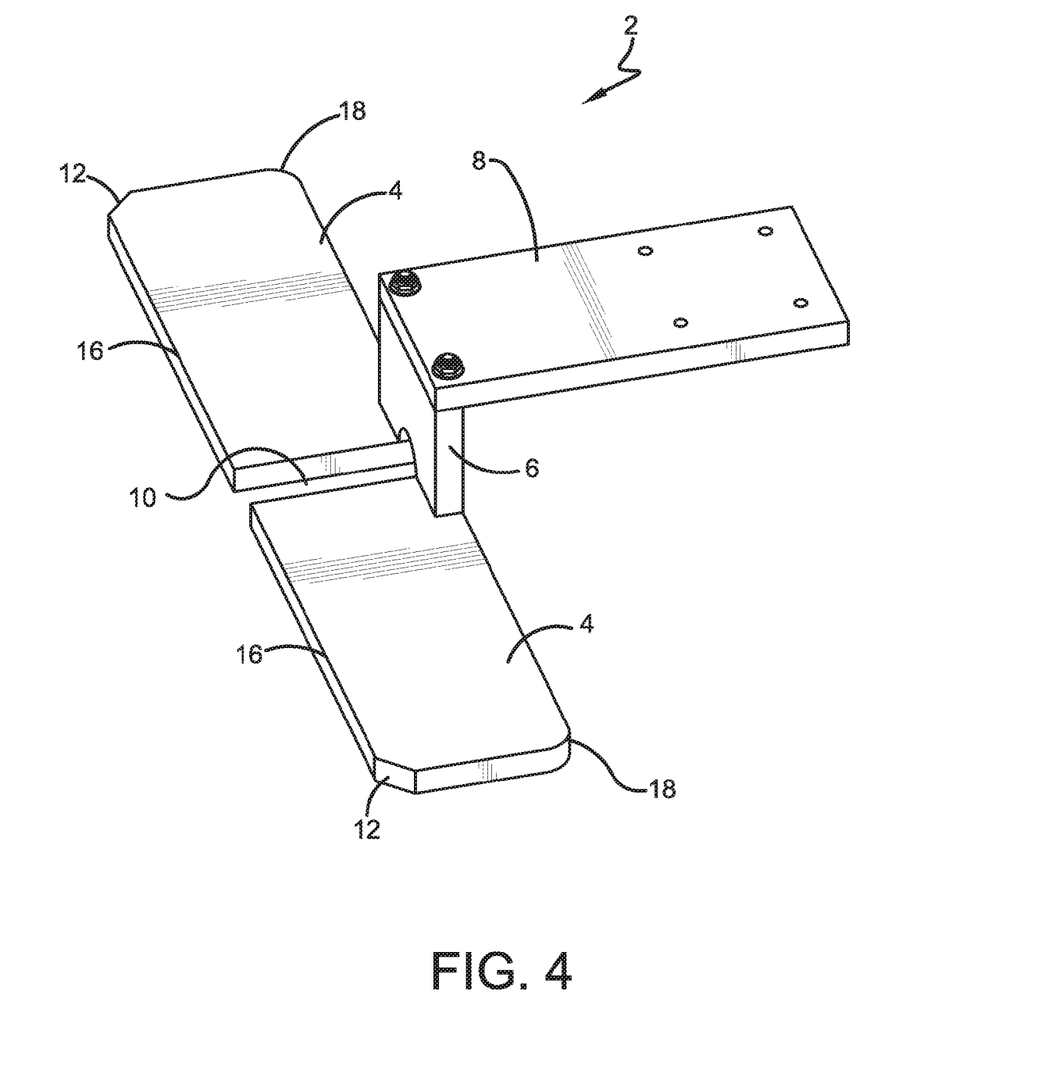
FIG. 4 is a perspective view of a second configuration of the mount.
Figure 5:
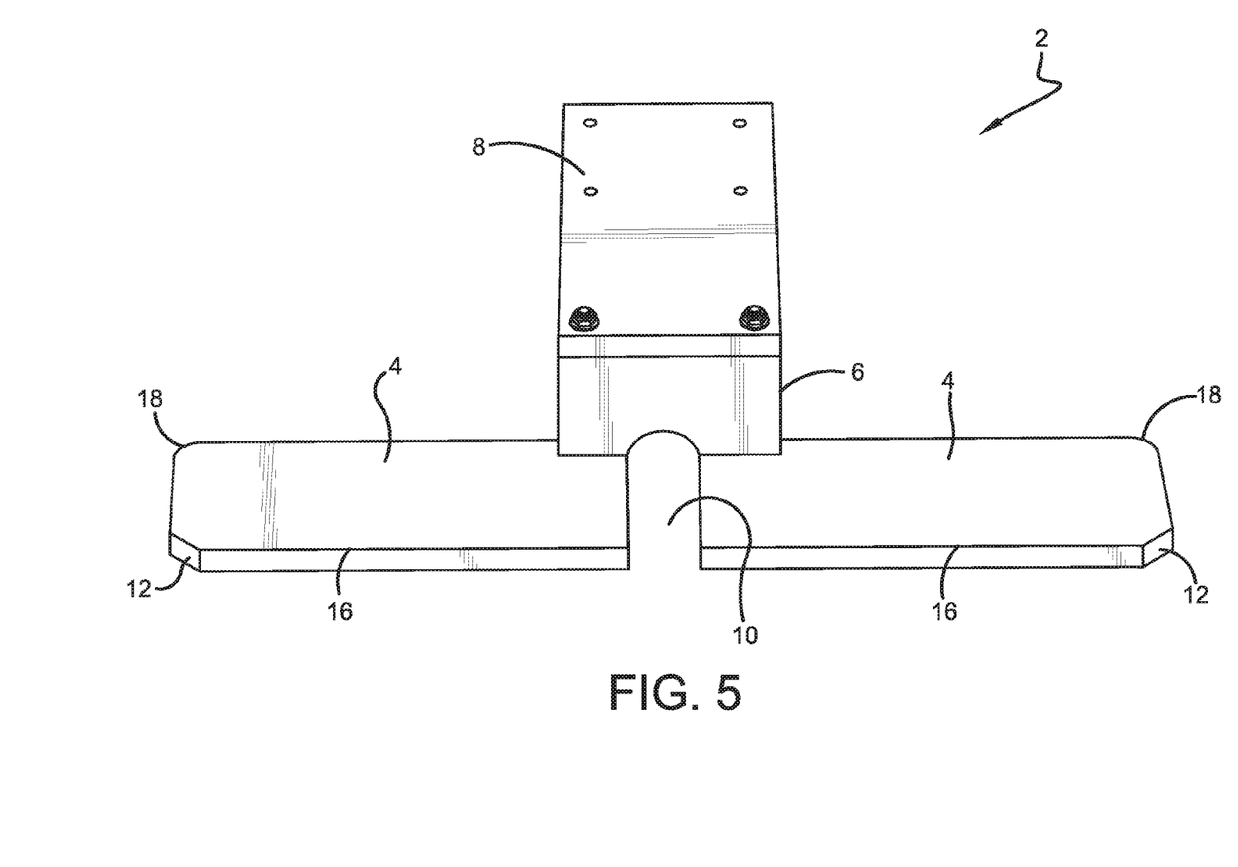
FIG. 5 is another perspective view of the second configuration.

Neck 6 extends up from bottom to top at least 3.5 inches. Neck 6 is used to position arm 8 above or on top of the golf cart bumper 24. As shown in FIG. 2, slot 10 extends up into the lower portion of neck 6 in the form of a half circle. Neck 6 is used to position arm 8 over the rear lip 26 provided in most golf carts to retain the lower ends of golf bags 22. An optional clamp 28 can be positioned to engage bumper 24 to further support mount 2. Clamp 28 is carried by arm 8. Clamp 28 is connected with one or more fasteners 30 such as wing nuts that can be loosened and tightened by the user to allow the position of clamp 28 to be adjusted. Clamp 28 defines slots 32 that receive fasteners 30 to allow the position of clamp 28 to be adjusted by sliding it back and forth when fasteners 30 are loose.

Arm 8 carries washing device 1. When installed in a golf cart, arm 8 projects rearwardly from rear bumper 24 of the cart and positions washing device 1 in a convenient location for use and in a location that prevents dirty water from washing device 1 from spilling onto golf bags 22 or the user. A plurality of fasteners or other devices as required by the washing device are used to secure washing device 1 to arm 8. Holes 40 for fasteners can be defined by the outer end of arm 8. Arm 8 has a length of 8.5 inches which positions the washer far enough back from the lower ends of the golf bags to limit undesirable splashing of dirty water onto the bags.

Mount 2 can be fabricated from a variety of rigid materials such as polymer, wood, poly-wood, and metal. Mount 2 can be fabricated from bent metal bars or rods. Materials that are water-resistant or treated to be water-resistant are desired because of the operating environment of mount 2.

In the third configuration, reinforcing gussets 42 are disposed between neck 6 and feet 4.

In the third configuration, neck 6 is completely divided by slot 10 and slot 10 is enlarged at the junction of feet 4 and neck 6. This enlarged area 44 is defined by cutaway inner corners of both feet 4 and cutaway lower inner corners of neck 6. Enlarged area 44 accommodates structural protrusions on golf bag rack 20 and functions with a variety of different golf bag racks 20.

The user of mount 2 can secure it in place by first placing feet 4 in the bottom of the club rack disposed on the back of a golf cart. Feet 4 and neck 6 can be configured to prevent mount 2 from tipping out of the golf cart until the golf bag or golf bags are added. The user then places one or two golf bags on feet 4 and straps the bags into place using the normal strap provided on the golf cart. The weight of the golf bag or bags holds mount in place during use and while the golf cart is driven. Clamp 28 can be used as an option. In this manner, mount 2 positions the ball and club washer in a convenient location for both golfers that substantially reduces the chance of splashing dirty water onto the cart riders or their clubs. Mount 2 can be removed after the golf bags are removed from the cart. The user can then dump the dirty water from the washing device and store mount 2 in a vehicle for use with a different cart which can be at a different golf course.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the descriptions and illustrations of the exemplary configurations are examples and the claimed invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A mount that removably secures a washing device to a golf cart bag rack, the mount comprising: a first foot adapted to be secured under a golf bag on the golf cart bag rack; a second foot spaced from the first foot and adapted to be secured under another golf bag on the golf cart bag rack; an arm adapted to support the washer device behind the cart; a neck that connects the first and second feet to the arm; wherein a slot spaces the first foot from the second foot and a portion of the slot is formed by the neck; and wherein the slot has an enlarged area at the junction of the neck and the first and second feet.

2. The mount of claim 1, further comprising a gusset disposed between the neck and the first foot.

3. The mount of claim 1, further comprising a clamp carried by the arm; the clamp adapted to engage a rear bumper of the golf cart.

4. A golf cart with a removable washing device carried by a mount having a foot disposed between a golf bag and a golf bag rack carried by the golf cart.

5. The golf cart of claim 4, further comprising a golf cart rear bumper and the mount having a clamp that engages the golf cart rear bumper of the golf cart.

6. A method for using a washing device with a golf cart comprising the steps of:

without using independent fasteners, placing a foot of a mount in the bottom of a golf bag rack that is carried by a golf cart wherein the washing device is carried by the mount; and     placing a golf bag on the foot of the mount and securing the golf bag to the golf bag rack.

\* \* \* \* \*